United States Patent
Hixon

(10) Patent No.: US 7,882,596 B2
(45) Date of Patent: Feb. 8, 2011

(54) ADJUSTABLE HANDLE CLAMP SYSTEMS AND METHODS

(75) Inventor: William K. Hixon, Boise, ID (US)

(73) Assignee: Motion Minder LLC, Boise, ID (US)

( * ) Notice: Subject to any disclaimer, the term of this patent is extended or adjusted under 35 U.S.C. 154(b) by 418 days.

(21) Appl. No.: 12/031,857

(22) Filed: Feb. 15, 2008

(65) Prior Publication Data

US 2008/0196205 A1 Aug. 21, 2008

Related U.S. Application Data

(60) Provisional application No. 60/889,992, filed on Feb. 15, 2007.

(51) Int. Cl.
*B25G 1/00* (2006.01)

(52) U.S. Cl. .............................. 16/426; 16/422; 16/436; 16/446; 16/406

(58) Field of Classification Search ................ 16/110.1, 16/422, 426, 427, 430, 436, 440, 443, 446, 16/406, 408, DIG. 24, DIG. 25, DIG. 40, 16/DIG. 41
See application file for complete search history.

(56) References Cited

U.S. PATENT DOCUMENTS

| | | | | | |
|---|---|---|---|---|---|
| 1,503,348 | A | * | 7/1924 | Bruhn | 74/557 |
| 1,534,075 | A | * | 4/1925 | Parrish | 16/426 |
| 4,683,610 | A | * | 8/1987 | Richards et al. | 16/429 |
| 4,794,667 | A | * | 1/1989 | Nelson et al. | 16/426 |
| 5,054,830 | A | * | 10/1991 | Nisenbaum | 294/58 |
| 6,491,402 | B1 | * | 12/2002 | Stenzel | 359/871 |
| 6,581,246 | B1 | * | 6/2003 | Polette | 16/429 |
| 7,014,232 | B2 | * | 3/2006 | Bosa | 294/58 |
| 7,203,986 | B2 | * | 4/2007 | Pears et al. | 15/28 |
| 7,300,081 | B1 | * | 11/2007 | Murray et al. | 294/58 |
| 7,657,972 | B2 | * | 2/2010 | Jenkins | 16/426 |
| 2005/0011051 | A1 | * | 1/2005 | Bosa | 16/436 |

\* cited by examiner

*Primary Examiner*—Victor Batson
*Assistant Examiner*—Jeffrey O'Brien
(74) *Attorney, Agent, or Firm*—Kilpatrick Townsend & Stockton LLP

(57) ABSTRACT

An auxiliary handle clamp system includes an upper base, a lower base coupleable with the upper base, a handle attachment coupled with the upper base, and a plurality of adjustable collets coupled with the upper and lower bases.

16 Claims, 11 Drawing Sheets

ADJUSTABLE HANDLE CLAMP SYSTEMS AND METHODS

CROSS-REFERENCES TO RELATED APPLICATIONS

This application is a nonprovisional of, and claims the benefit of priority from, U.S. Provisional Patent Application No. 60/889,992 filed Feb. 15, 2007. This application is also related to U.S. Pat. Nos. 6,401,833, 6,796,383, and 6,955,228. The entire content of each of these filings is incorporated herein by reference for all purposes.

BACKGROUND OF THE INVENTION

Embodiments of the present invention relate to clamp systems and methods, and in particular to an adjustable clamp that can be adjusted to accommodate cylindrical objects or handles of various sizes or degrees of taper.

Shovels, pitchforks, and other hand tools are useful for performing a variety of tasks. Unfortunately, such tools often force the user to have their hands in an unergonomic position. In some cases, it may be desirable to equip such tools with an auxiliary handle grip to provide ergonomic advantage to the tool operator. Yet many hand tools have substantially tapered handles, making it difficult to mount an auxiliary handle grip onto the handle of the tool. Moreover, different types of tools typically have handles of different shapes and sizes. What is needed are improved clamp systems and methods for clamping an auxiliary handle grip to a handle of a tool. Embodiments of the present invention provide a solution for at least some of these needs.

BRIEF SUMMARY OF THE INVENTION

Embodiments of the present invention encompass clamp devices and methods that can be used for cylindrical objects, substantially cylindrical objects, tapered objects, and other handle designs. Advantageously, such clamps can be used with objects of various sizes or various degrees of taper. Often, the clamp is applied to a cylindrical object such as a broomstick, a shovel handle, a pitchfork handle, and the like. An exemplary clamp can include, for example, a first base, a second base, an attachment for a handle such as a "D" handle, and a plurality of collets. A collet can include raised projections, or stops, which allow the collet to be adjustably positioned within indents of the first and second bases. If the clamp is to be placed on a cylinder having a larger diameter, the collet can be adjusted toward the center of the bases. Conversely, if the clamp is to be placed on a cylinder having a smaller diameter, the collet can be adjusted toward the end of the base. A tapered cylinder can be accommodated by placing one collet toward the base center, and another collet toward the base end. Advantageously, this design allows the tool operator to easily and successfully install or adjust the clamp. Embodiments of the present invention are well suited for use with any of a variety of tools, such as those described in previously incorporated U.S. Pat. Nos. 6,401,833, 6,796,383, and 6,955,228.

In one aspect, embodiments of the present invention provide an auxiliary handle clamp system. The system can include, for example, an upper base, a lower base coupled with the upper base, and a handle attachment coupled with the upper base. The system can also include a plurality of collets in operative association with the upper base and the lower base.

In another aspect, embodiments of the present invention encompass an auxiliary handle clamp system that includes an upper collet that operatively associates with an upper base, and a lower collet that operatively associates with a lower base. A clamp system may also include an attachment assembly that releasably secures the upper base with the lower base. The attachment assembly may include a spacer configured to be placed at least partially between the upper base and the lower base. In some cases, the upper base includes an aperture configured to receive a coupling bolt, and the lower base includes an aperture configured to receive the coupling bolt. A clamp system may also include a handle grip coupled with the handle attachment. The handle grip can be rotatable relative to the handle attachment. In some cases, the upper collet includes a stop, and the upper base includes a holder configured to interface with the stop. In some cases, the lower collet includes a stop, and the lower base includes a holder configured to interface with the stop.

In still another aspect, embodiments of the present invention include methods of installing an auxiliary handle clamp system on a tool handle. Such methods may include, for example, placing a first clamp assembly on the tool handle, where the first clamp assembly includes a first base and a first collet. Methods may also include placing a second clamp assembly on the tool handle, where the second clamp assembly includes a second base and a second collet. According to some embodiments, methods may include coupling the first base with the second base. Methods may also include setting the first collet at a desired position along the first base, and setting the second collet at a desired position along the second base. In some cases, the first base includes a first aperture and the second base includes a second aperture. The step of coupling the first base with the second base can include tightening an attachment assembly, such as a bolt system, that is disposed at least partially within the first aperture and the second aperture. In some cases, methods may include removing a spacer that is at least partially disposed between the first base and the second base. Methods may also include coupling a handle grip to the first base or the second base. According to some embodiments, the step of setting the first collet at the desired position along the first base can include situating a stop of the first collet at a holder of the first base, or engaging a stop of the first collet with a holder of the first base. Similarly, the step of setting the second collet at the desired position along the second base can include situating a stop of the second collet at a holder of the second base, or engaging a stop of the second collet with a holder of the second base. Methods may also include applying a compressive force to the first base and the second base. In some cases, a compressive force is applied with an attachment assembly, such as a bolt system. Applying a compressive force to the first base and the second base can introduce or create friction between the tool handle and one or more clamp assemblies of the clamp system, for example a first clamp assembly and a second clamp assembly. Relatedly, applying a compressive force to the first base and the second base can introduce or create friction between the tool handle and each of the first collet and the second collet.

In some aspects, embodiments of the present invention encompass an auxiliary handle clamp system that can include, a first base and a second base. The first base can have a recess, an aperture, and a handle attachment. The second base can have a recess and an aperture, and may be coupleable with the first base. The clamp system may also include a first collet disposed at least partially within the recess of the first base, a second collet disposed at least partially within the recess of the second base, and an attachment assembly disposed at least partially within the aperture of the first base and the aperture of the second base. Optionally, the clamp system includes a third collet at least partially disposed within the recess of the first base, and a fourth collet at least partially disposed within the recess of the second base.

In yet another aspect, embodiments of the present invention encompass methods of assembling an auxiliary handle clamp system for use with a tool handle. Methods may include placing a first upper collet within a recess of an upper base, placing a first lower collet within a recess of a lower base, and coupling the upper base and the lower base with an attachment assembly.

For a fuller understanding of the nature and advantages of the present invention, reference should be had to the ensuing detailed description taken in conjunction with the accompanying drawings.

DETAILED DESCRIPTION OF THE INVENTION

Tool handles and other objects present a variety of different sizes, shapes, and degrees of taper. For example, many wooden handles for common garden tools are substantially tapered in shape or profile. Hand held tools are used to perform a wide variety of functions. For example, these implements are commonly used in outdoor applications, and particularly in the fields of farming, landscaping, digging, excavating, gardening, and cultivation. Examples of hand held tools include rakes, shovels, hoes, spades, pitchforks, scythes, scoops, and the like, including hand held weed and plant harvesting tools.

Embodiments of the present invention encompass clamp devices and methods that can be used for cylindrical objects or substantially cylindrical objects. Advantageously, such clamps can be used with objects of various sizes or various degrees of taper. Often, the clamp is applied to a cylindrical object such as a broomstick, a shovel handle, a pitchfork handle, and the like. Such clamps are well suited for use with any of a variety of auxiliary handle grips, including rotating handles, "D" handles, and the like. An exemplary clamp can include, for example, a first base, a second base, an attachment for a handle grip such as a "D" handle grip, and a plurality of collets. A collet can include raised projections, or stops, which allow the collet to be adjustably positioned within indents of the first and second bases. If the clamp is to be placed on a cylinder having a larger diameter, the collet can be adjusted toward the center of the bases. Conversely, if the clamp is to be placed on a cylinder having a smaller diameter, the collet can be adjusted toward the end of the base. A tapered cylinder can be accommodated by placing one collet toward the base center, and another collet toward the base end.

Figure 1:
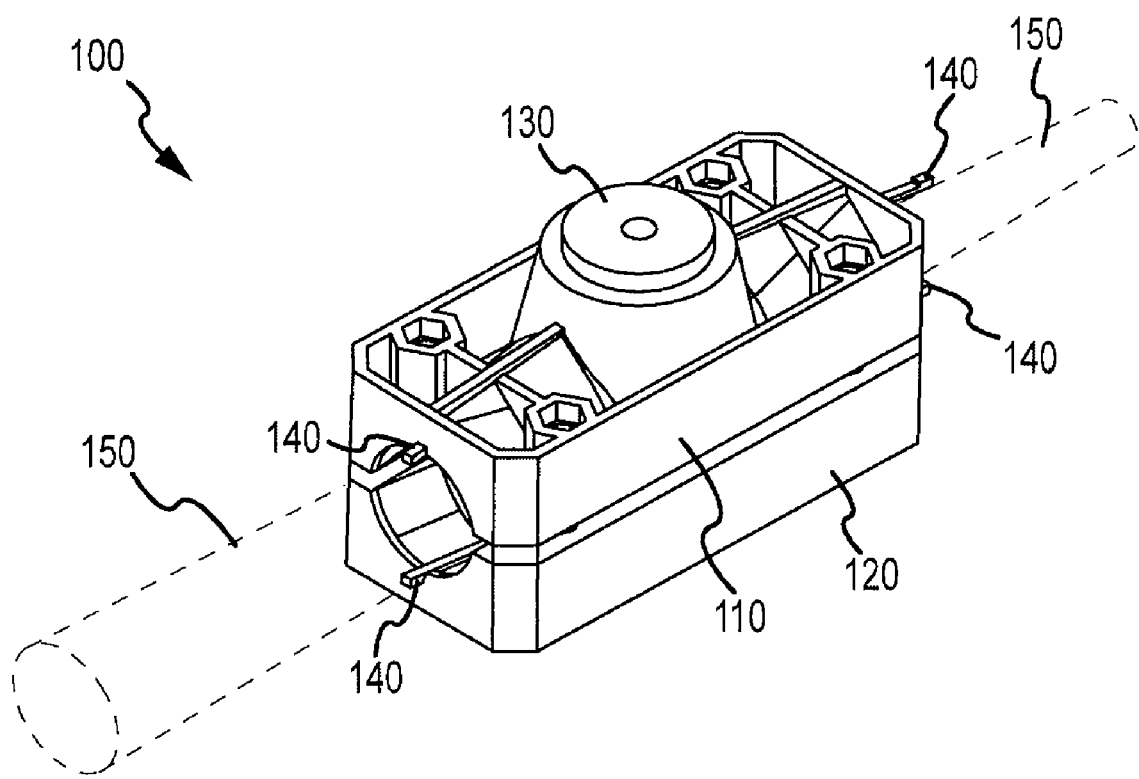
FIG. 1 illustrates an auxiliary handle clamp system according to embodiments of the present invention.

Turning now to the drawings, FIG. 1 illustrates an auxiliary handle clamp system 100 according to embodiments of the present invention. Handle clamp system 100 includes a first or upper base 110, a second or lower base 120, a handle attachment 130, and a plurality of collets 140. Upper base or casting 110 is coupleable with lower base or casting 120 via any suitable coupling mechanisms or means, including screws, fasteners, and the like. Handle attachment 130 can be coupled with upper base 110 via any suitable coupling mechanisms or means, including screws, fasteners, and the like. Optionally, handle attachment 130 may be constructed as part of upper base 110 or as an integral feature of upper base 110. Handle clamp system 100 can be coupled with a handle 150 such as a tool handle or other cylindrical object or rod, such that collets 140 contact tool handle 150. Tool handle 150 can be tapered, and can have any of a variety of diameters. Auxiliary handle clamp system 100 can be used with handles of all different sizes, shapes, and degrees of taper. Thus, auxiliary handle clamp system 100 can be fitted to virtually any handle.

Figure 2:
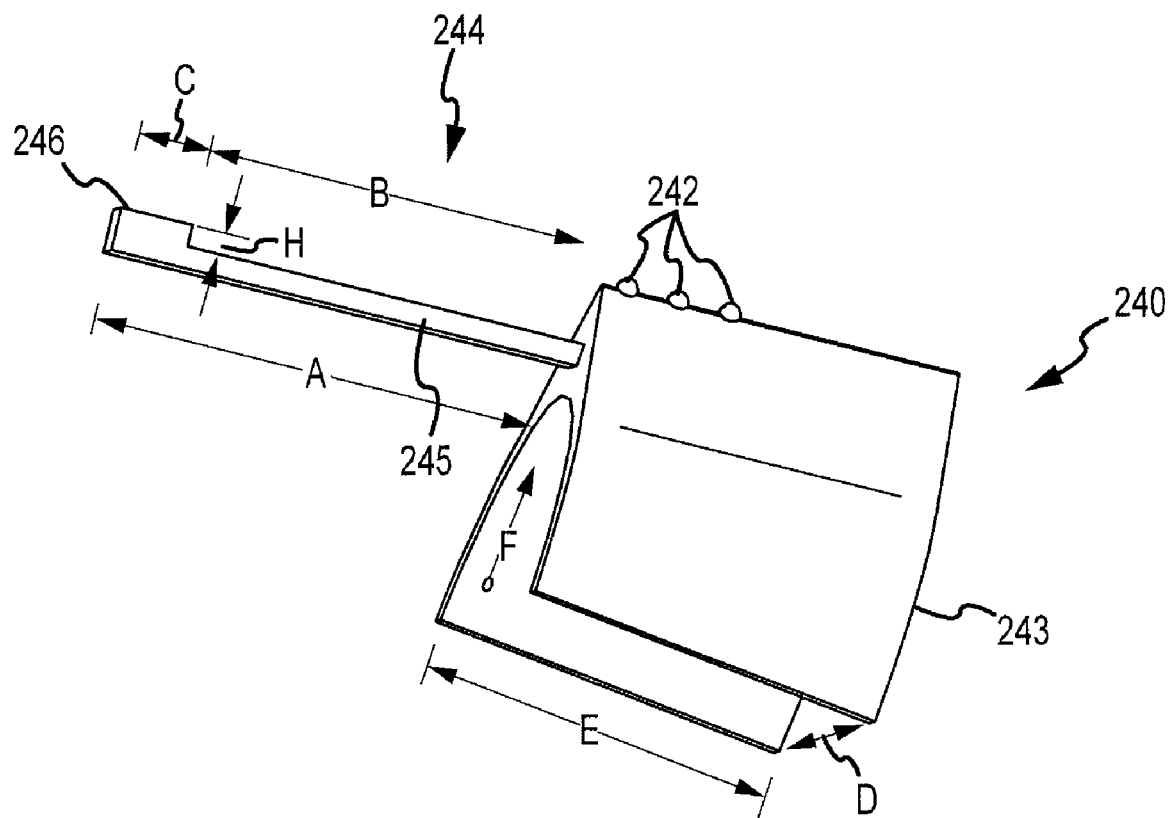
FIGS. 2 and 2A illustrates a collet according to embodiments of the present invention.
Figure 2A:
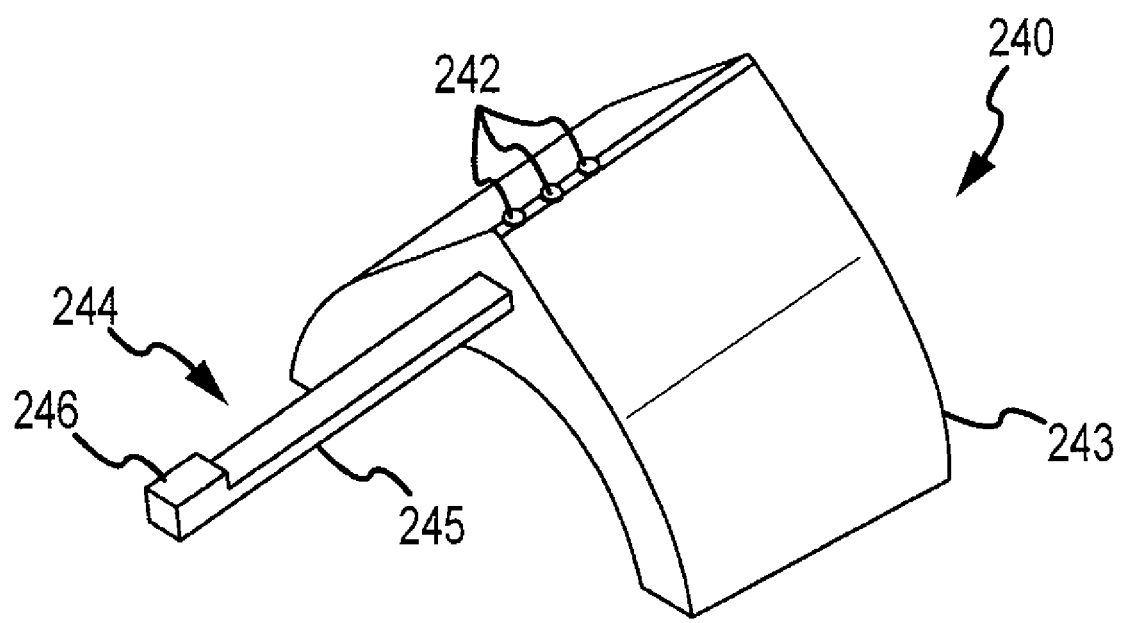

FIG. 2 illustrates a collet 240 according to embodiments of the present invention. Collet 240 includes a plurality of stops 242 and a pull tab 244. As shown here, pull tab 240 can have a length A within a range from about 0.75 inches to about 1.75 inches. In some embodiments, length A is about 1.316 inches. Pull tab 244 may include a stem 245 having a length B within a range from about 0.75 inches to about 1.75 inches. In some embodiments, stem 245 has a length B of about 1.118 inches. Pull tab 244 may include a cleat 246 having a length C within a range from about 0.050 inches to about 0.500 inches. In some embodiments, cleat 246 has a length C of about 0.198 inches. Relatedly, cleat 246 can have a height H within a range from about 0.030 inches to about 0.090 inches. In some embodiments, height H is about 0.060 inches. Collet 240 may include a sleeve or trough 243 having a width D within a range from about 1.000 inch to about 2.000 inches. In some embodiments, trough 243 has a width D of about 1.636 inches. Trough 243 may have a length E within a range from about 0.500 inches to about 1.500 inches. In some embodiments, trough 243 has a length E of about 1.000 inch. In some cases, trough 243 defines a semicircular or arc shape. As shown here, trough 243 can define a semicircular shape having a radius F within a range from about 0.200 inches to about 2.200 inches. In some embodiments, radius F is about 0.615 inches. In some embodiments, radius F is about 0.738 inches. Stops 242 can have a height G within a range from about 0.010 inches to about 0.080 inches. In some embodiments, stops 242 have a height G of about 0.031 inches. FIG. 2A shows another view of collet 240 according to embodiments of the present invention. Collet 240 includes a stop 242 and a pull tab 244 having a stem 245 and a cleat 246. Collet 240 also includes a trough 243. It is understood that the dimensions provided herein are exemplary in nature, and that any element of the auxiliary handle clamp system can have any desired dimension to suit any of a variety of needs.

Figure 3:
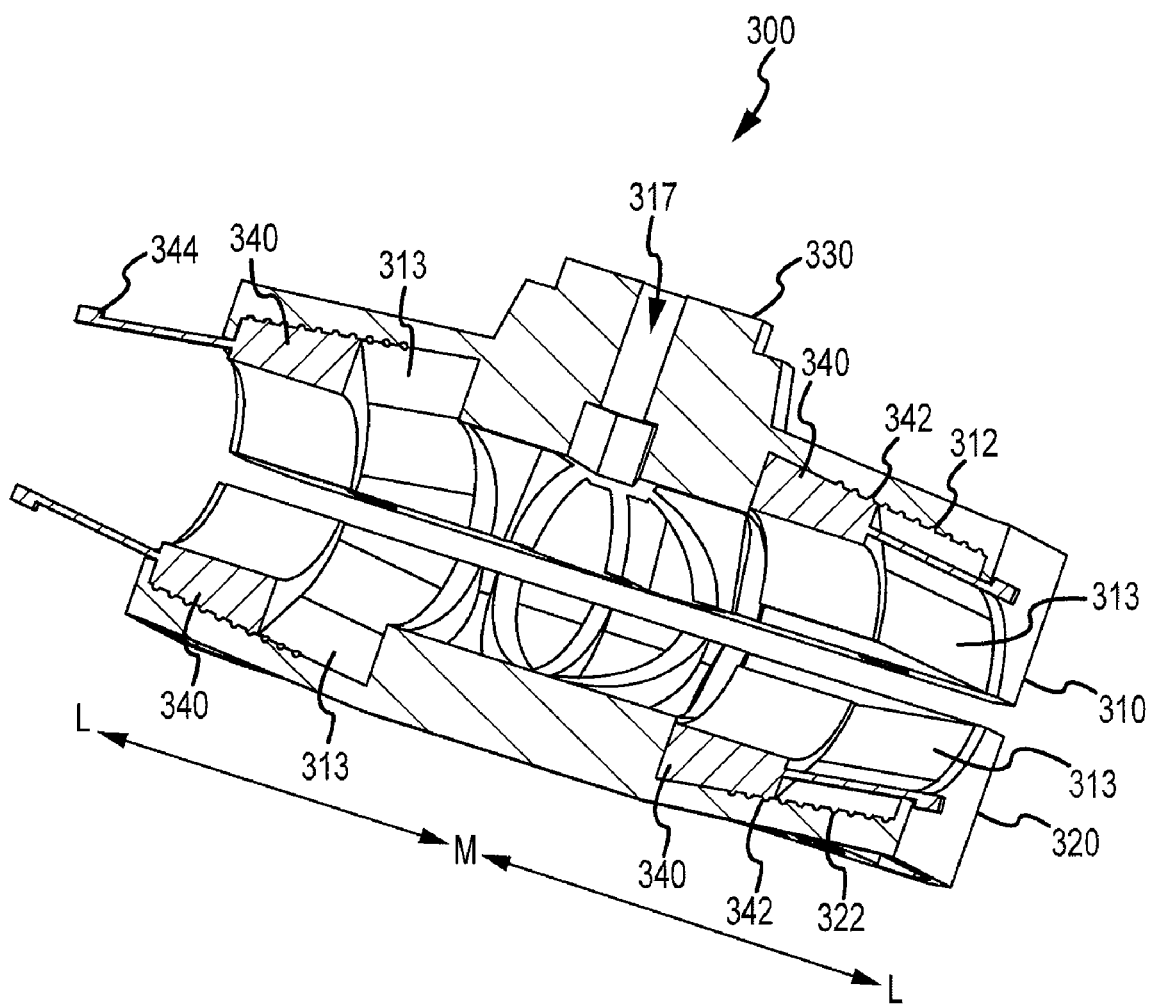
FIG. 3 illustrates an auxiliary handle clamp system according to embodiments of the present invention.

FIG. 3 shows a cross-section of an auxiliary handle clamp system 300 according to embodiments of the present invention. Auxiliary handle clamp system 300 includes a first or upper base 310, a second or lower base 320, a handle attachment 330, and a plurality of collets 340. Upper base 310 is coupleable with lower base 320 via any suitable coupling mechanisms or means, including screws, fasteners, and the like. Handle attachment 330 can be coupled with upper base 310 via any suitable coupling mechanisms or means, including screws, fasteners, and the like. Optionally, handle attachment 330 may be constructed as part of upper base 310 or as an integral feature of upper base 310. In some cases, auxiliary handle clamp system 300 can be used to attach a handle grip with a tool handle, for example at or toward the forward or working end of the handle. Upper base 310 can include an aperture 317 that at least partially receives an attachment mechanism for coupling a handle grip with the upper base. In some embodiments, an attachment mechanism may include a bolt system having one or more components of the bolt system shown in FIG. 4A. First base 310 may include one or more recesses 313 that receive a collet.

Collets 340 can be manufactured from or include any of a variety of materials. Often, collets 340 include urethane or a thermoplastic rubber. Collets 340 can be configured to prevent or inhibit stick slip between collets 340 and a tool handle. Relatedly, collets 340 can be configured to provide a non-slip or slip-resistant interface between the collet and the tool handle. Further, collets 340 can also be configured to provide little or minimal compression set. Collets 340 can provide reliable, long term clamping of auxiliary clamping system 300 to a tool handle. Auxiliary handle clamp system 300 can be configured such that upper base 310 and lower base 320 do not contact the tool handle during use, whereby the tool handle is only contacted by collets 340. Auxiliary handle clamp system 300 can be configured to provide a set or desired amount of crush with a washer and spacer so as to provide a reliable or desired amount of clamping pressure to the tool handle.

As seen in FIG. 3, upper base 310 can include a plurality of holders or indents 312 for interfacing with or receiving stops 342 of collets 340. Thus, collet 340 can be disposed toward a medial section M of system 300, toward a lateral section L of system 300, or at any desired location therebetween. By adjusting the position of collets 340, it is possible to adjust the amount of clamping pressure provided by the collets, or to adjust the geometry of the collet configuration so that auxiliary handle clamp system 300 can accommodate any of a variety of tool handle shapes, sizes, tapers, diameters, and the like. Collets 340 can include pull tabs 344 that allow an operator to easily adjust the position of the collet relative to the upper or lower base. Pull tabs may be configured with scribed marks, spaced as desired, so as to aid the operator in adjusting the collet to the desired position. In some cases, the scribed marks are about 0.125 inches apart. An operator can utilize such scribed marks to ensure, for example, that a top collet is appropriately aligned or positioned relative to a bottom collet. In some embodiments, stops 342 of collets 340 can help ensure that the collets do not rotate during use, or undergo unwanted lateral movement. Handle clamp system 300 can be coupled with a handle such as a tool handle or other cylindrical object or rod, such that collets 340 contact and grip the tool handle. The tool handle can be tapered, and can have any of a variety of diameters. Auxiliary handle clamp system 300 can be used with handles of all different sizes, shapes, and degrees of taper. Thus, auxiliary handle clamp system 300 can be fitted to virtually any handle. For example, auxiliary handle clamp system 300 is well suited for use with any of a variety of auxiliary handles, including rings, hooks, D-handles, and the like. In some embodiments, an auxiliary handle clamp system includes an auxiliary handle. The auxiliary handle may be integral with or a part of the upper base or the lower base.

Figure 4:
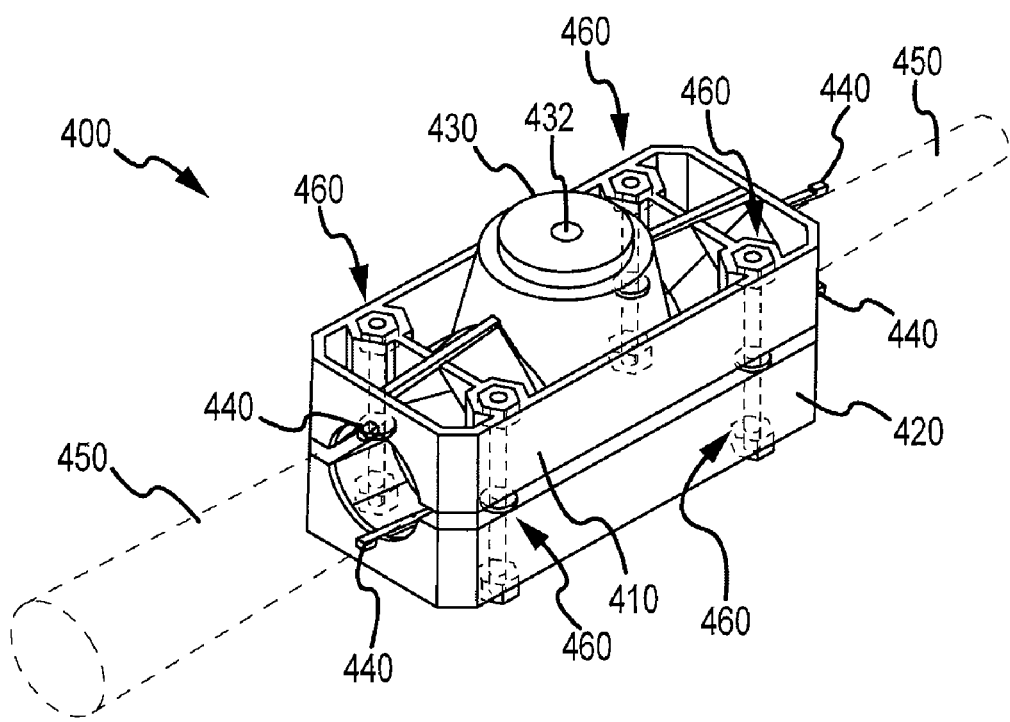
FIGS. 4-4D illustrate an auxiliary handle clamp system according to embodiments of the present invention.

FIG. 4 shows an auxiliary handle clamp system 400 according to embodiments of the present invention. Handle clamp system 400 includes a first or upper base 410, a second or lower base 420, a handle attachment 430, and a plurality of collets 440. Upper base 410 is coupleable with lower base 420 via any suitable coupling mechanisms or means, including screws, fasteners, and the like. For example, upper base and lower base can be held together with one or more bolt systems 460. Handle attachment 430 can be coupled with upper base 410 via any suitable coupling mechanisms or means, including screws, fasteners, and the like. Optionally, handle attachment 430 may be constructed as part of upper base 410 or as an integral feature of upper base 410. Handle clamp system 400 can be coupled with a handle 450 such as a tool handle or other cylindrical object or rod, such that collets 440 contact tool handle 450. Tool handle 450 can be tapered, and can have any of a variety of diameters. Auxiliary handle clamp system 400 can be used with handles of all different sizes, shapes, and degrees of taper. Thus, auxiliary handle clamp system 400 can be fitted to virtually any handle. In some embodiments, handle attachment 430 includes a bearing surface 432 that contacts a handle grip (not shown). Bearing surface 432 can provide a lubricity or low coefficient of friction between the handle attachment and the handle grip. In some cases, bearing surface 432 includes a non-stick or stick-resistant material such as polytetrafluoroethylene (PTFE) or Teflon®. Such materials can be resistant to wear, and provide constant and reliable torque characteristics to the system. Hence, the system will maintain adequate torque even after significant periods of use.

Figure 4A:
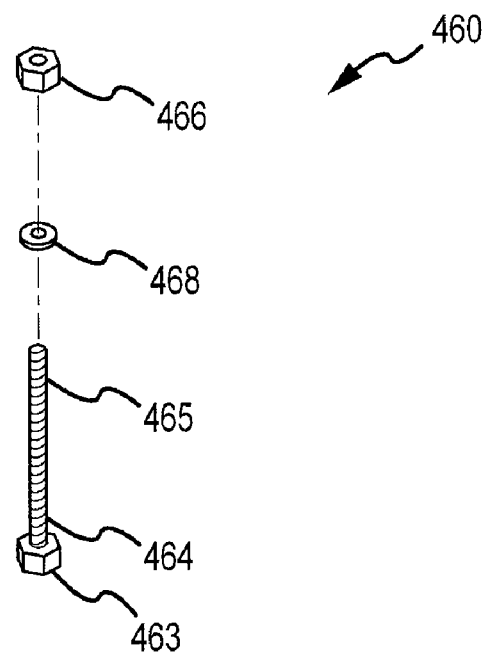
Figure 4B:
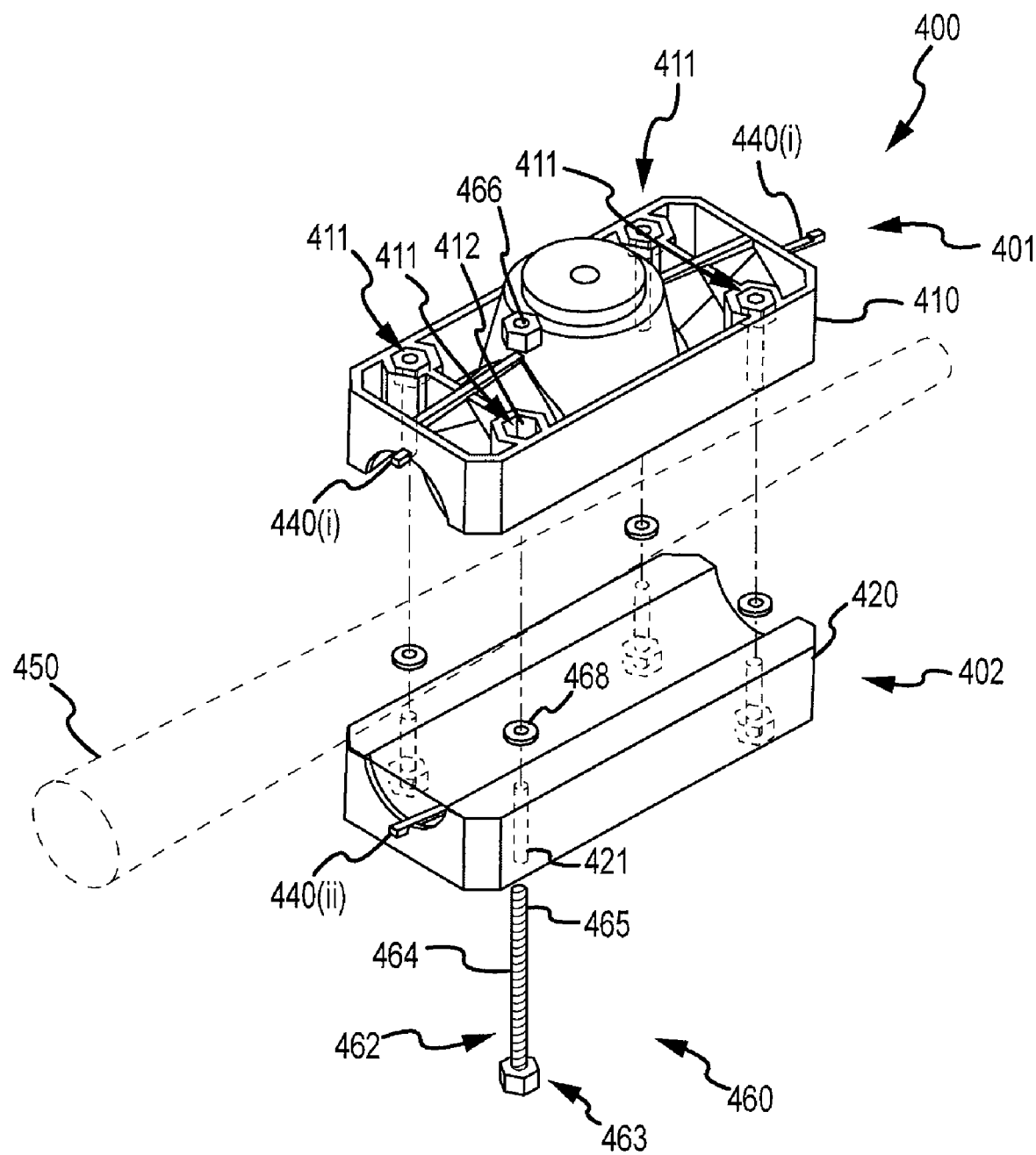
Figure 4C:
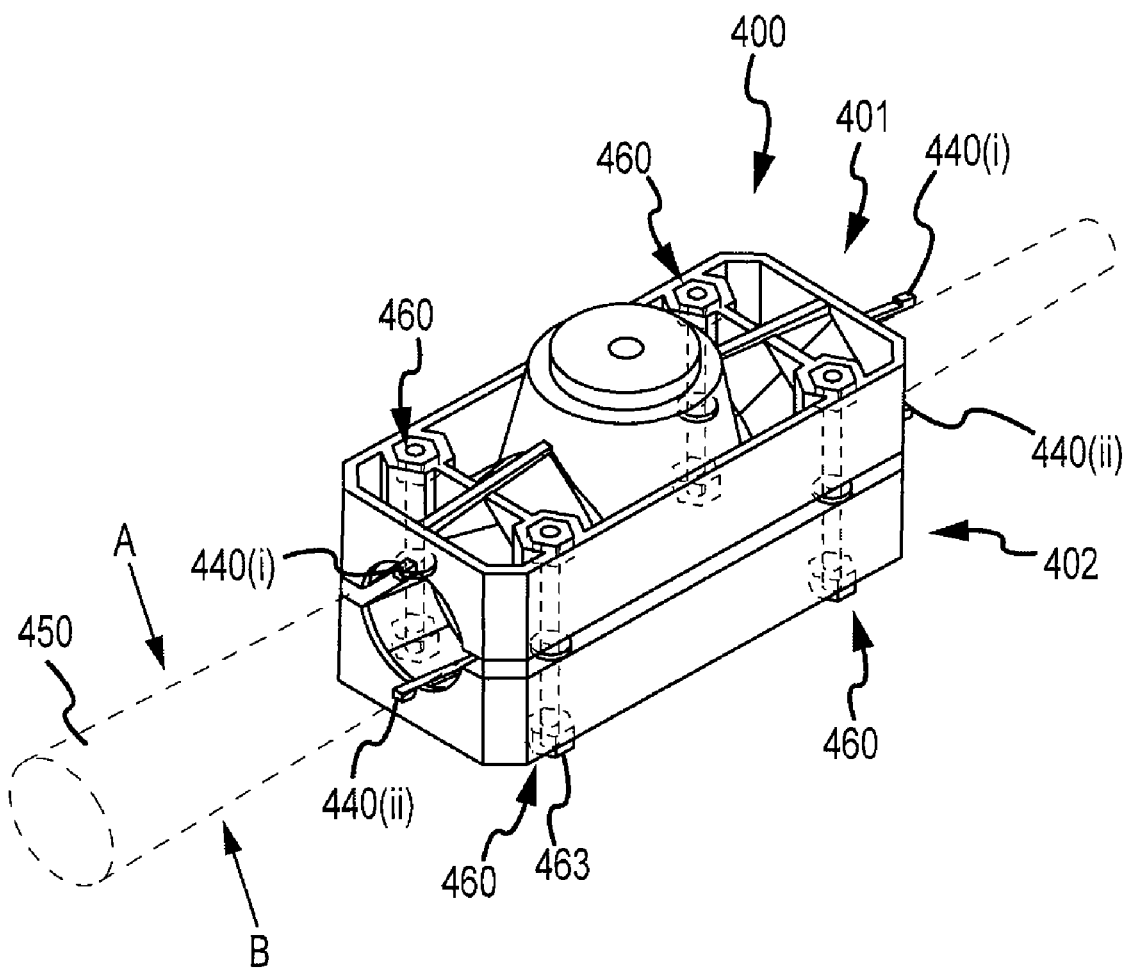

As shown in FIG. 4A, a bolt system 460 can include a bolt or fastener 462 having a head 463 and shaft 464 with threads 465, a nut 466, and a washer 468. Nut 466 can be shaped or configured to seat within recess 412 of base 410. Upper base 410 and lower base 420 can have aligned passages or cylindrical channels 411, 421 configured to receive shaft 464 of bolt 462. In use, an operator can install an auxiliary handle clamp system according to the steps described in FIGS. 4B to 4D. As depicted in FIG. 4B, such a method may include placing a first clamp assembly 401 on the tool handle 450, where first clamp assembly 401 includes first base 410 and one or more first collets 440(*i*). The method can also include placing a second clamp assembly 402 on the tool handle, where second clamp assembly 402 includes second base 420 and one or more second collets 440(*ii*). The user or operator can couple or adjust a coupling between first base 410 and second base 420. For example, it is possible to set a first collet 440(*i*) at a desired position along first base 410. Similarly, it is possible to set a second collet 440(*ii*) at a desired position along second base 420. In some cases, the step of setting a collet at a desired position along a base involves situating a stop of the collet at a holder of the base, such that the collet stop and the base holder interface and prevent relative translational or rotational movement between the collet and the base. In some cases, first base 410 includes one or more first apertures 411 and second base 420 includes one or more second apertures 421. The user or operator can couple or fasten the first base with the second base by tightening an attachment assembly, such as a bolt system 460, that is disposed at least partially within the first aperture and the second aperture. For example, a bolt or fastener 462 can be passed through or inserted at least partially into apertures 411 and 421 of first base 410 and second base 420, respectively. Washer or spacer 468 can be placed on shaft 464 of bolt 462, between first base 410 and second base 420. Nut 466 can be placed on threaded portion 465 of bolt 462, such that nut is seated within recess 412 of base 410. As illustrated in FIG. 4C, bolt head 463 can be tightened, so as to compress first base 410 and second base 420 toward each other, as indicated by arrows A and B, and against tool handle 450. According to some embodiments, this process can be repeated until each bolt system 460 is suitably tightened, and clamp system 400 is securely fixed with or snug tight with tool handle 450. As shown here, clamp system 400 may include 4 bolt systems, for example. The application of this compressive force to the bases can introduce, create, or increase friction between tool handle 450 and each of the first clamp assembly 401 and the second clamp assembly 402. For example, application of this compressive force to the bases can introduce, create, or increase friction between tool handle 450 and each of the first collets 440(i) and the second collets 440(ii). Collet adjustment can be performed prior to or following application of a compressive force.

Figure 4D:
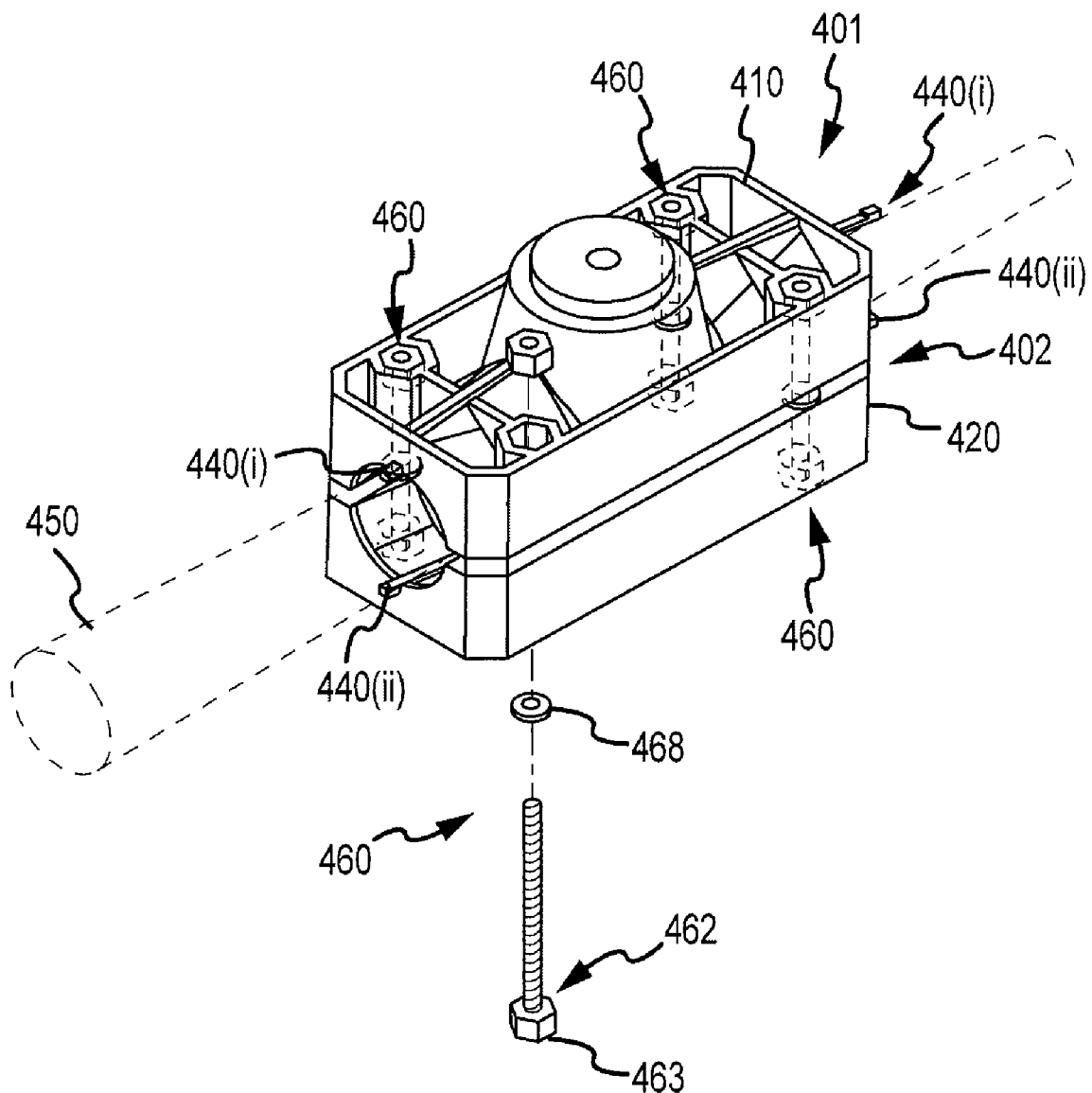

In some embodiments, installation methods may include further compressing the bases toward one another. For example, as shown in FIG. 4D, it is possible to at least partially remove bolt 462 from the bases 410, 420, remove spacer 468 from between the bases, and reposition spacer 468 toward the bottom of second base 420. This procedure can be performed on each bolt system 460, so that each spacer 468 is situated between bolt head 463 and a bottom surface of second base 420. The application of this additional compressive force to the bases can introduce, create, or increase friction between tool handle 450 and each of the first clamp assembly 401 and the second clamp assembly 402. For example, application of this additional compressive force to the bases can introduce, create, or increase friction between tool handle 450 and each of the first collets 440(i) and the second collets 440(ii). Collet adjustment can be performed prior to or following application of a compressive force. When sufficient compressive force is applied to steadfastly secure the clamp system with the tool handle further collet adjustment may not be possible because, for example, it may be difficult to disengage the collet stops from the base holders.

Figure 5:
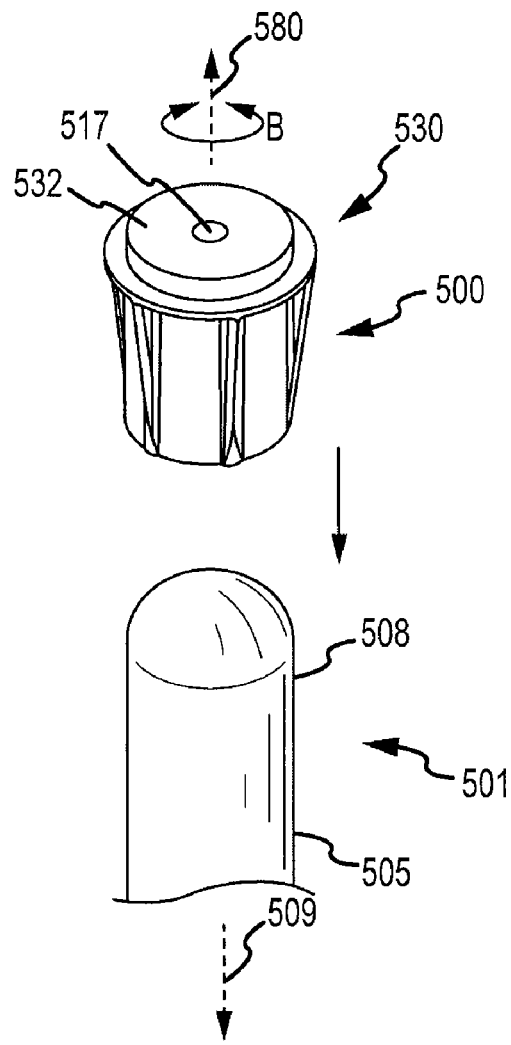
FIGS. 5 and 5A illustrate a clamp system according to embodiments of the present invention.
Figure 5A:
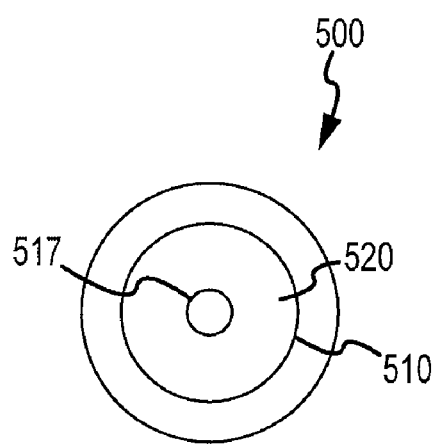

FIG. 5 illustrates a perspective view of an auxiliary clamp system 500, and a tool handle 505 of a tool 501. Clamp system 500 can be used to attach a distal handle grip (not shown) with tool handle 505, for example at or toward the rear or distal end 508 of the handle 505. According to some embodiments, a distal end handle grip is coupled with handle 505 via auxiliary clamp system 500. Distal end handle grip can rotate relative to system 500 about an axis 580, which may be colinear with a longitudinal axis 509 of the handle 505. As indicated by arrow B, the handle grip can rotate in a clockwise or counterclockwise fashion about axis 580. In some embodiments, clamp system 500 includes a handle grip attachment 530 that can couple with a handle grip. Handle grip attachment 530 can include a bearing surface 532 that contacts a handle grip. Bearing surface 532 can provide a lubricity or low coefficient of friction between the handle attachment and the handle grip. In some cases, bearing surface 532 includes a non-stick or stick-resistant material such as polytetrafluoroethylene (PTFE) or Teflon®. Such materials can be resistant to wear, and provide constant and reliable torque characteristics to the system. Hence, the system will maintain adequate torque even after significant periods of use. As shown in the end view depicted in FIG. 5A, distal end auxiliary clamp system 500 includes a casing 710 that at least partially defines a bore 520. Bore 720 can be configured to receive a handle or a portion of a handle of a hand tool. For example, bore 520 can be cylindrical in shape, and can be configured for placement onto the distal end of a cylindrical handle of a tool. In some embodiments, bore 520 has an inner diameter of about 1.5 inches. In some embodiments, bore 520 has an inner diameter of about 1.25 inches. It is understood that bore 520 can have any desired diameter or shape so as to receive a tool handle. Clamp system 500 include an aperture 517 that at least partially receives an attachment mechanism for coupling a handle grip with the clamp system. In some embodiments, an attachment mechanism may include a bolt system having one or more components of the bolt system shown in FIG. 4A.

Figure 6:
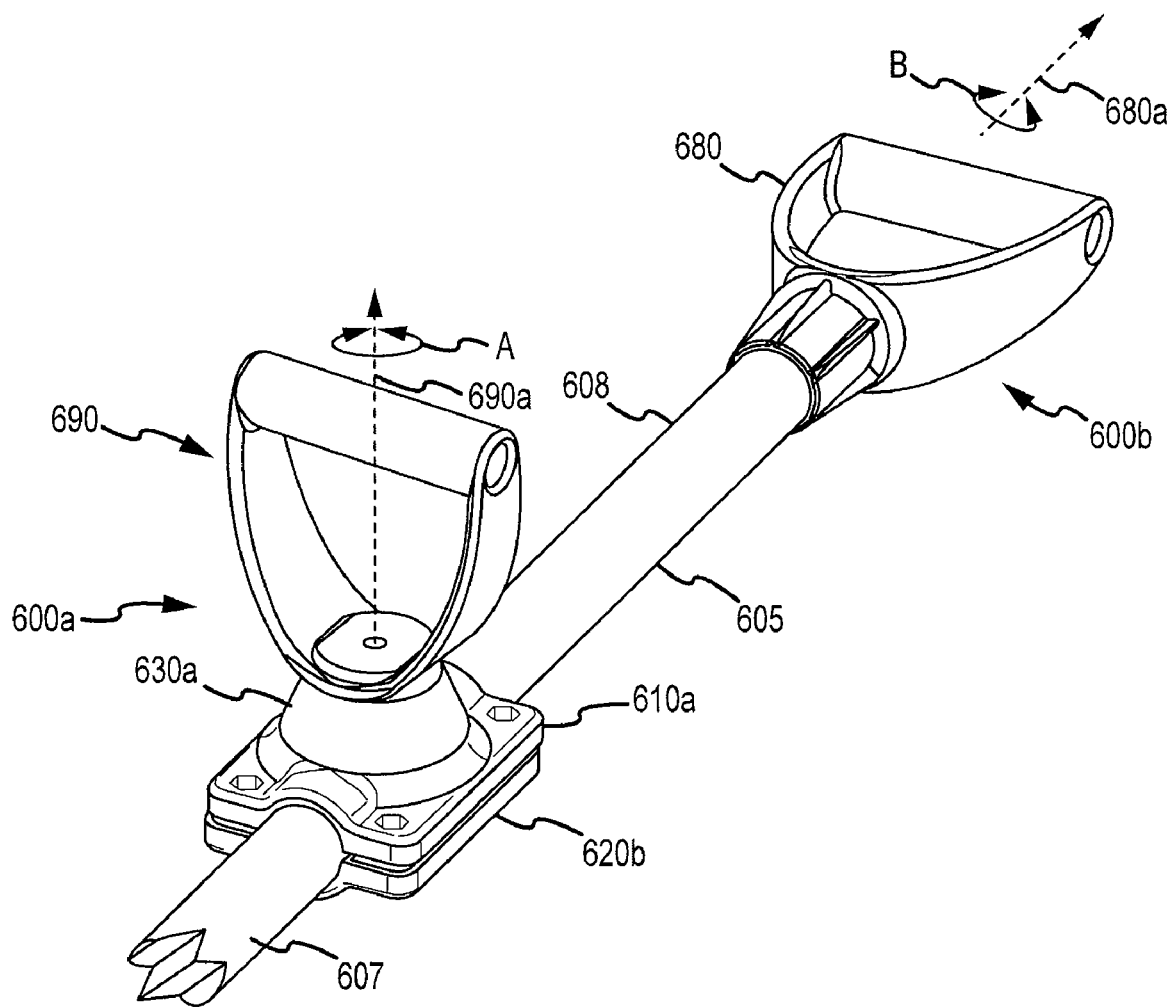
FIG. 6 illustrates auxiliary handle clamp systems according to embodiments of the present invention.

FIG. 6 illustrates a perspective view of a first auxiliary clamp system 600a and a second auxiliary clamp system 600b coupled with a handle or shaft 605 of a tool 600, according to embodiments of the present invention. First auxiliary clamp system 600a includes a first or upper base 610a, a second or lower base 620a, a handle attachment 630a, and a plurality of collets (not shown). Upper base 610a is coupleable with lower base 620a via any suitable coupling mechanisms or means, including screws, fasteners, bolt systems, and the like. Handle attachment 630a can be coupled with upper base 610a via any suitable coupling mechanisms or means, including screws, fasteners, bolt systems, and the like. Optionally, handle attachment 630a may be constructed as part of upper base 610a or as an integral feature of upper base 610a. In some cases, auxiliary handle clamp system 600a can be used to attach a handle grip with a tool handle, for example at or toward the forward or working end 607 of the handle 605. According to some embodiments, a first or working end handle grip 690 is coupled with handle 605 via first auxiliary clamp system. Working end handle grip 690 can rotate relative to system 600a about an axis 690a, which may be perpendicular to a longitudinal axis 609a of the handle. As indicated by arrow A, handle grip 690 can rotate in a clockwise or counterclockwise fashion about axis 690a. The degree of rotation provided by embodiments invention can vary, according to the needs of the user. Accordingly, the working end handle grip 690 may be configured with a wide range of rotatability, in order to accommodate the axis of wrist rotation. The degree or rotatability of the working end handle grip 690 may depend on the height of the user, the length of their arm, or both. The working end handle grip 690 may be freely rotatable throughout the range of rotation, and the working end handle grip 690 may be fixed at any desired angle or position within the range of rotation.

In use, the working end handle grip 690 provides the tool user with multiple benefits. For example, the user does not need to reach down so far when grasping the working end handle grip 690, as compared to when the user grips the handle 605 itself. Subsequently, the user may experience less strain or discomfort to their back. Further, as the working end handle grip 690 can be rotatably coupled with the handle 605, the user has the freedom to adjust the orientation of the working end handle grip 690 to an ergonomically desirable position or range of rotation, thereby reducing strain or discomfort to their wrist and forearm. This can be particularly effective when using the tool in highly repetitive tasks, or when managing heavy materials with the tool. The working end handle grip 690 also allows the user to grip the tool with higher degree of control, as the tool is less likely to slip or rotate during use. The user may also adjust the locations of the first or distal handle clamp system 600a, so as to position the working end handle grip 690 on any desired location along the handle 605. For example, the working end handle grip 690 may be coupled with the handle 605 at a site located more toward the distal working end 607 of the handle. Alternatively, the working end handle grip 690 may be coupled with the handle 605 at a site located more distant from the distal end 607 of the handle, further toward the proximal end 608 of the handle. This allows the user to have more control over the balancing of the load carried by the tool, and the position may be adjusted depending on the task for which the tool is being used.

As shown in FIG. 6, second auxiliary clamp system 600b can be used to attach a distal handle grip 680 with tool handle 605, for example at or toward the rear or distal end 608 of the handle 605. According to some embodiments, a second or distal end handle grip 680 is coupled with handle 605 via second auxiliary clamp system 600b. Distal end handle grip 680 can rotate relative to system 600b about an axis 680a, which may be colinear with a longitudinal axis 609a of the handle. As indicated by arrow B, handle grip 680 can rotate in a clockwise or counterclockwise fashion about axis 680a. The degree of rotation provided by embodiments invention can vary, according to the needs of the user. Accordingly, the distal end handle grip 680 may be configured with a wide range of rotatability, in order to accommodate the axis of wrist rotation. The degree or rotatability of the working end handle grip 680 may depend on the height of the user, the length of their arm, or both. The working end handle grip 680 may be freely rotatable throughout the range of rotation, and the working end handle grip 680 may be fixed at any desired angle or position within the range of rotation. In use, the distal end handle grip 680 provides the tool user with multiple benefits. As the distal end handle grip 680 can be rotatably coupled with the handle 605, the user has the freedom to adjust the orientation of the working end handle grip 680 to an ergonomically desirable position or range of rotation, thereby reducing strain or discomfort to their wrist and forearm. This can be particularly effective when using the tool in highly repetitive tasks, or when managing heavy materials with the tool. In some embodiments, the handle grips, or D-handles, can be manufactured from the same mold. Distal or second auxiliary clamp system 600b can include any of a variety of useful features, including features such as those disclosed elsewhere herein with reference to FIGS. 5 and 5A.

Figure 7A:
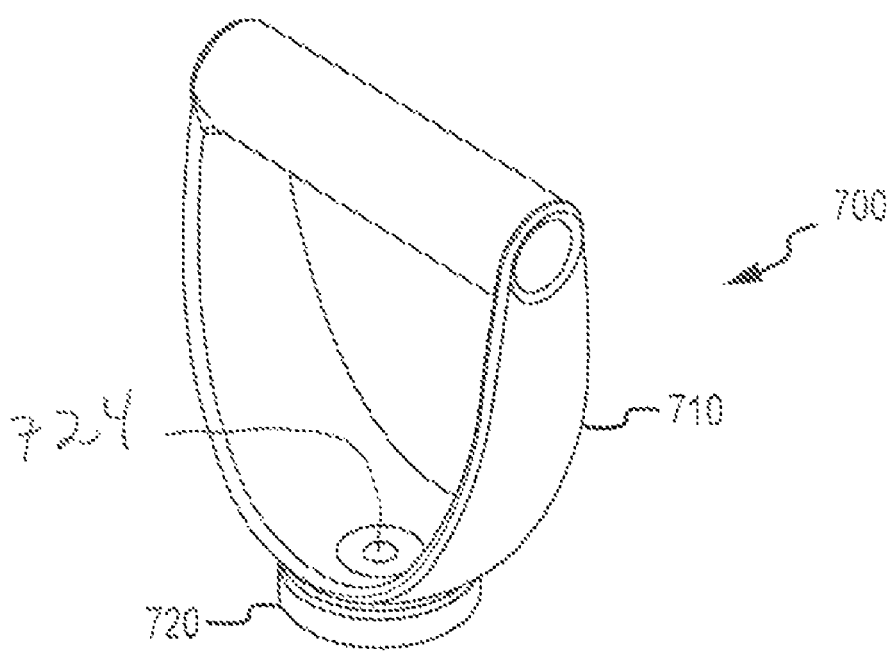
FIGS. 7A and 7B illustrate a handle grip according to embodiments of the present invention.
Figure 7B:
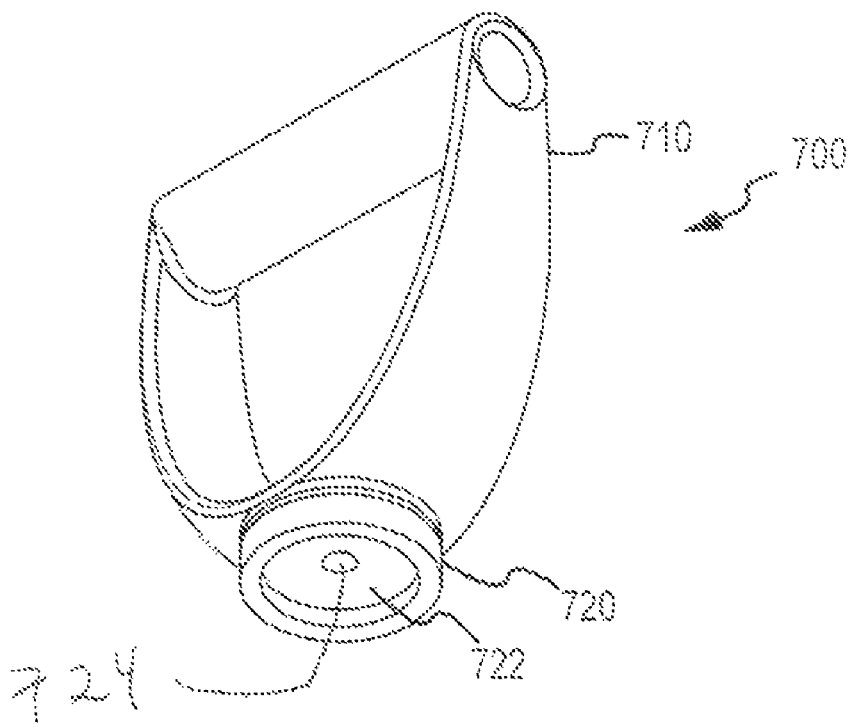

FIGS. 7A and 7B depict views of an exemplary handle grip 700, according to embodiments of the present invention. Handle grip 700 includes a D-handle 710, and a base 720 for attachment with a handle grip attachment. Base 720 includes a bearing surface 722 that contacts a bearing surface of a handle grip attachment (not shown). Bearing surface 722 can provide a lubricity or low coefficient of friction between the handle grip and the handle grip attachment. In some cases, bearing surface 722 includes a non-stick or stick-resistant material such as polytetrafluoroethylene (PTFE) or Teflon®. Such materials can be resistant to wear, and provide constant and reliable torque characteristics to the system. Hence, the system will maintain adequate torque even after significant periods of use. Base 720 may also include an aperture 724 that at least partially receives an attachment mechanism for coupling the handle grip with a handle grip attachment of a first or upper base. Optionally, aperture 724 can be aligned with an aperture of a base, such as aperture 317 of the first base depicted in FIG. 3. In some embodiments, an attachment mechanism may include a bolt system having one or more components of the bolt system shown in FIG. 4A. Similarly, aperture 724 can at least partially receive an attachment mechanism for coupling the handle grip with a distal end handle grip attachment, or for example a clamp system as shown in FIG. 5. Optionally, aperture 724 can be aligned with an aperture of a clamp system, such as aperture 517 of the clamp system depicted in FIG. 5. In some embodiments, an attachment mechanism may include a bolt system having one or more components of the bolt system shown in FIG. 4A.

An auxiliary handle clamp system can include or be coupled with an auxiliary handle grip that does not force the user to hold the tool in an unergonomic position. In some embodiments, the auxiliary handle may include a rotatable handle that can be rotated to a desired or otherwise ergonomically favorable position. In some cases, the rotatable handle may be rotatable during use as the operator uses the tool. In some cases, the handle grip may be fixed relative to the handle. In some cases, a tool may be a plant harvesting device having a harvesting means used to cut and remove vegetation without pulling the vegetation out by its roots. The tool may also be configured to cut vegetation off at or near the surface of the ground, with the ability to accumulate a quantity of cut plants for eventual collection. The tool may further be configured to provide a variable angle of attack, so that the tool may slid along the ground and strike the stems of plants near the ground, cutting them off. Embodiments of the present invention provide auxiliary handle clamp systems for a hand held tool, such as a plant harvesting device, that can include or be coupled with a rotatable handle grip. The rotatable handle grip provides the tool user with the convenience and advantage of adjusting the orientation of the handle grip, thus allowing the user to hold the tool in an ergonomically favorable or otherwise desirable position.

In some embodiments, upper base, lower base, or both may incorporate reinforcement materials, for example a 5-10% fiberglass construction, such that the auxiliary handle clamp system can accommodate heavy loads or resist crushing when subjected to large forces. In some cases, an auxiliary handle clamp system can withstand loads of 100 pounds or more.

The preceding description has been presented only to illustrate and describe exemplary embodiments of the methods and systems of the present invention. It is not intended to be exhaustive or to limit the invention to any precise form disclosed. The foregoing embodiments are illustrative, and no single feature or element is essential to all possible combinations that may be claimed in this or a later application. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention. The invention may be practiced otherwise than is specifically explained and illustrated without departing from its spirit or scope. This description of the invention should be understood to include all novel and non-obvious combinations of elements described herein, and claims may be presented in a later application to any novel and non-obvious combination of these elements.

What is claimed is:

1. An auxiliary handle clamp system, comprising:
   an upper base having a handle attachment;
   a lower base coupleable with the upper base;
   an upper collet in operative association with the upper base; and
   a lower collet in operative association with the lower base,
   wherein the upper collet comprises a stop and the upper base comprises a first holder and a second holder each configured to interface with the upper collet stop, such that engagement between the upper collet stop and the upper base first holder or second holder prevents relative rotational movement between the upper collet and the upper base,
   wherein the upper collet is translationally adjustable, relative to the upper base, between a first position where the upper collet stop engages the upper base first holder and a second position where the upper collet stop engages the upper base second holder,
   wherein the lower collet comprises a stop and the lower base comprises a first holder and a second holder each configured to interface with the lower collet stop, such that engagement between the lower collet stop and the lower base first holder or second holder prevents relative rotational movement between the lower collet and the lower base, and wherein the lower collet is translationally adjustable, relative to the lower base, between a first position where the lower collet stop engages the lower base first holder and a second position where the lower collet stop engages the lower base second holder.

2. The system of claim 1, further comprising an attachment assembly that releasably secures the upper base with the lower base.

3. The system of claim 2, wherein the attachment assembly comprises a spacer configured to be placed at least partially between the upper base and the lower base.

4. The system of claim 1, wherein the upper base comprises an aperture configured to receive a coupling bolt, and the lower base comprises an aperture configured to receive the coupling bolt.

5. The system of claim 1, further comprising a handle grip coupled with the handle attachment.

6. The system of claim 5, wherein the handle grip is rotatable relative to the handle attachment.

7. A method of installing an auxiliary handle clamp system on a tool handle, comprising:

placing a first clamp assembly on the tool handle, the first clamp assembly comprising a first base and a first collet;

placing a second clamp assembly on the tool handle, the second clamp assembly comprising a second base and a second collet;

coupling the first base with the second base; setting the first collet at a desired position along the first base; and setting the second collet at a desired position along the second base, wherein the first collet comprises a stop and the first base comprises a first holder and a second holder each configured to interface with the first collet stop, such that engagement between the first collet stop and the first base first holder or second holder prevents relative rotational movement between the first collet and the first base, wherein the first collet is translationally adjustable, relative to the first base, between a first position where the first collet stop engages the first base first holder and a second position where the first collet stop engages the first base second holder, wherein the second collet comprises a stop and the second base comprises a first holder and a second holder each configured to interface with the second collet stop, such that engagement between the second collet stop and the second base first holder or second holder prevents relative rotational movement between the second collet and the second base, and wherein the second collet is translationally adjustable, relative to the second base, between a first position where the second collet stop engages the second base first holder and a second position where the second collet stop engages the second base second holder.

8. The method of claim 7, wherein the first base comprises a first aperture and the second base comprises a second aperture, and the step of coupling the first base with the second base comprises tightening an attachment assembly that is disposed at least partially within the first aperture and the second aperture.

9. The method of claim 7, further comprising removing a spacer that is at least partially disposed between the first base and the second base.

10. The method of claim 7, further comprising coupling a handle grip to the first base or the second base.

11. The method of claim 7, further comprising applying a compressive force to the first base and the second base.

12. The method of claim 11, wherein the compressive force is applied with an attachment assembly.

13. The method of claim 11, wherein applying a compressive force to the first base and the second base introduces or creates friction between the tool handle and each of the first clamp assembly and the second clamp assembly.

14. The method of claim 11, wherein applying a compressive force to the first base and the second base introduces or creates friction between the tool handle and each of the first collet and the second collet.

15. An auxiliary handle clamp system, comprising:

a first base having a recess, an aperture, and a handle attachment;

a second base having a recess and an aperture, wherein the second base is coupleable with the first base;

a first collet disposed at least partially within the recess of the first base;

a second collet disposed at least partially within the recess of the second base; and an attachment assembly disposed at least partially within the aperture of the first base and the aperture of the second base, wherein the first collet comprises a stop and the first base comprises a first holder and a second holder each configured to interface with the first collet stop, and the first collet is translationally adjustable, relative to the first base, between a first position where the first collet stop engages the first base first holder and a second position where the first collet stop engages the first base second holder, and wherein the second collet comprises a stop and the second base comprises a first holder and a second holder each configured to interface with the second collet stop, and the second collet is translationally adjustable, relative to the second base, between a first position where the second collet stop engages the second base first holder and a second position where the second collet stop engages the second base second holder.

16. The system of claim 15, further comprising a third collet at least partially disposed within the recess of the first base, and a fourth collet at least partially disposed within the recess of the second base.

* * * * *